United States Patent
Ohno et al.

(10) Patent No.: US 6,483,818 B1
(45) Date of Patent: Nov. 19, 2002

(54) SIMULTANEOUS PAGING SIGNAL SENDING SYSTEM, SENDING METHOD USED THEREFOR, AND RECORDING MEDIUM ON WHICH CONTROL PROGRAM THEREFOR IS RECORDED

(75) Inventors: Yoshiaki Ohno, Tokyo (JP); Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/361,401

(22) Filed: Jul. 27, 1999

(30) Foreign Application Priority Data

Jul. 30, 1998 (JP) .......................................... 10-215208

(51) Int. Cl.[7] .............................................. H04Q 7/00
(52) U.S. Cl. ...................... 370/328; 455/432; 455/503; 455/458
(58) Field of Search .......................... 370/310.1, 310.2, 370/328; 455/422, 432, 433, 435, 458, 525, 502, 503

(56) References Cited

U.S. PATENT DOCUMENTS

| | | | |
|---|---|---|---|
| 5,058,201 A | 10/1991 | Ishii et al. ..................... 455/33 |
| 5,289,527 A | 2/1994 | Tiedemann, Jr. .............. 379/59 |
| 5,305,466 A | * 4/1994 | Taketsugu ..................... 455/435 |
| 5,485,463 A | * 1/1996 | Godorojo ..................... 370/333 |
| 5,533,094 A | 7/1996 | Sanmugam .................... 379/57 |
| 5,842,130 A | * 11/1998 | Oprescu-Surcobe et al. ..................... 455/456 |
| 6,101,388 A | * 8/2000 | Keshavachar ................ 455/435 |
| 6,181,945 B1 | * 1/2001 | Lee ............................. 455/458 |
| 6,185,421 B1 | * 2/2001 | Alperovich et al. ......... 455/433 |
| 6,188,898 B1 | * 2/2001 | Phillips ....................... 455/433 |
| 6,292,667 B1 | * 9/2001 | Wallentin et al. ........... 455/458 |

FOREIGN PATENT DOCUMENTS

| | | |
|---|---|---|
| JP | 1-3116281 | 12/1989 |
| JP | 2-109431 | 4/1990 |
| JP | 5-68004 | 3/1993 |
| JP | 5-122136 | 5/1993 |
| JP | 5-167512 | 7/1993 |
| JP | 6-78356 | 3/1994 |
| JP | 6-141367 | 5/1994 |
| JP | 6-327048 | 11/1994 |
| JP | 7-502630 | 3/1995 |
| WO | 98/28937 | 7/1998 |

* cited by examiner

Primary Examiner—Edward F. Urban
Assistant Examiner—Temica M. Davis
(74) Attorney, Agent, or Firm—Foley & Lardner

(57) ABSTRACT

A simultaneous paging signal sending system includes at least one mobile unit, a plurality of base stations for performing communication with the mobile unit, and a base station control apparatus for controlling the base stations. The base station control apparatus includes a BAI→output port correspondence table, and a signal copying/distributing section. In the BAI→output port correspondence table, a plurality of simultaneous paging areas, in which simultaneous broadcasting is performed to the mobile unit, are grouped into one simultaneous broadcast area, and information about each base station in the simultaneous broadcast area is stored to be paired with a broadcast area identifier allocated to each simultaneous broadcast area. The signal copying/distributing section reads out information about the base stations corresponding the broadcast area identifier included in a paging signal from the base station information storage means, and copies and distributes the paging signal to the base stations designated by the readout information.

20 Claims, 14 Drawing Sheets

PAGING SIGNAL a
| BROADCAST DATA IDENTIFIER | POSITION REGISTRATION AREA IDENTIFIER (LAI) | |
FIG. 2A
PAGING SIGNAL b
|←——— HEADER ———→|
|←—————————— ATM CELL ——————————→|
FIG. 2B
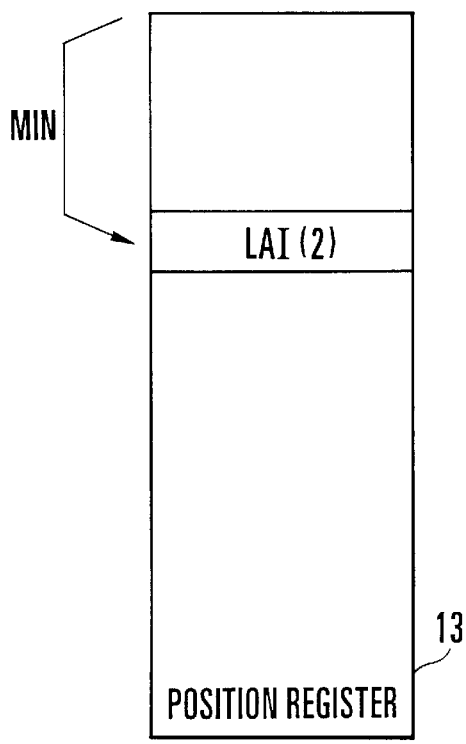
FIG. 3

BAI (a)

| OUTPUT PORT #1, #2, #3, ...... |
| OUTPUT PORT #2, #3, #4, ...... |
| OUTPUT PORT #3, #4, #5, ...... |
| OUTPUT PORT #4, #5, #6, ...... |
| OUTPUT PORT #5, #6, #7, ...... |

BAI → OUTPUT PORT
CORRESPONDENCE TABLE

F I G. 5

| BAI | | |
|---|---|---|
| | LAI (1) | BAI (a1) |
| | LAI (2) | BAI (a2) |
| | LAI (3) | BAI (a3) |
| | LAI (4) | BAI (a4) |
| | LAI (5) | BAI (b1) |
| | LAI (6) | BAI (b2) |
| | LAI (7) | BAI (b3) |
| | LAI (8) | BAI (b4) |
| | LAI (9) | BAI (c1) |
| | LAI (10) | BAI (c2) |
| | ... | ... |
| | BAI → LAI CONVERSION TABLE 100A | |

SIMULTANEOUS PAGING SIGNAL SENDING SYSTEM, SENDING METHOD USED THEREFOR, AND RECORDING MEDIUM ON WHICH CONTROL PROGRAM THEREFOR IS RECORDED

BACKGROUND OF THE INVENTION

The present invention relates to a simultaneous paging signal sending system, sending method used therefor, and recording medium on which a control program therefor is recorded and, more particularly, to a simultaneous paging signal sending system for performing simultaneous broadcasting with respect to each mobile unit when it moves away, by a predetermined distance or more, from a place where its position has been registered by a distance-based position registration scheme, and a new position is registered, a sending method therefore, and a recording medium on which a control program therefor is recorded.

According to the distance-based position registration scheme, when a terminal (mobile unit) moves away, by a predetermined distance or more, from a place where the terminal has registered its position with respect to the system, the new position is registered with respect to the system.

A base station in which the mobile unit has registered its position notifies each mobile unit of the coordinate information (latitude/longitude expressions) of the position of the base station and distance information about the next position to be registered. That is, the mobile unit is notified of BASE LONG (Longitude: the longitude of the base station), BASE LAT (Latitude: the latitude of the base station), and REG DIST (Distance: position registration distance).

When the mobile unit is powered on for the first time, it stores the position registration distance information and position information (latitude/longitude of a position registration base station) notified from a base station covering the zone in which the mobile unit exists as "REG_DIST_REG", "BASE_LAT_REG", and "BASE_LONG_REG".

Subsequently, every time the mobile unit moves across a base station area, the mobile unit loads coordinate information (latitude/longitude of a base station into which the mobile unit has moved) notified from the base station covering the zone in which the mobile unit exists, and calculates the distance between the base station in which the position has previously been registered and the base station covering the zone in which the mobile unit exists by the Pythagorean theorem having undergone spherical correction. When the calculation result exceeds the value of the position registration distance stored when the mobile unit has registered its position, it generates a new position registration request to the system.

As shown in FIG. 13, letting (Bace_Long_Reg, Bace_Lat_Reg) (stored in the mobile unit) be the coordinates of a base station BSO in which the mobile unit has previously registered its position, and (Bace_Long, Bace_Lat) be the coordinates of a base station BS1 in which the mobile unit current exists, a distance d between the base stations BSO and BS1 can be obtained by $\Delta Lat = (Bace\_Lat) - (Bace\_Lat\_Reg)$ $\Delta Long = [(Bace\_Long) - (Bace\_Long\_Reg)] \times \cos\{(\pi/180) \times [(Bace\_Lat\_Reg)/14400]\}$ $d = [(\Delta Lat)^2 + (\Delta Long)^2]^{1/2}/16$ In calculation of $\Delta Long$, (Bace_Long)−(Bace_Long_Reg) represents equatorial conversion, and $\cos\{(\pi/180) \times [(Bace\_Lat\_Reg)/14400]\}$ represents spherical correction using the latitude.

In the above distance-based position registration scheme, as shown in FIG. 15, a place where a mobile unit registers its position is a base station located at a predetermined distance from a base station in which the mobile unit has previously registered its position, and mobile units register their positions in different base stations. This therefore prevents position registration requests from concentrating on specific base stations.

In contrast to this, in the fixed position registration area scheme, as shown in FIG. 14, when a mobile unit moves outside a predetermined area, the mobile unit must register its position in an adjacent area. That is, the mobile unit must register its position in a base station on the area boundary (one of the base stations indicated by the hatching in FIG. 14).

In addition, in the distance-based position registration scheme, as shown in FIG. 17, after a mobile unit registers its position, next position registration is not performed until the mobile unit moves away by a given distance. For this reason, unstable generation of position registration requests on a position registration boundary as in the fixed position registration area scheme as shown in FIG. 16 can be prevented. This is because when the mobile unit registers its position, it looks as if the mobile unit was located in the center of the position registration area.

In the above distance-based position registration scheme, when a mobile unit is to be paged, and a terminating call is sent to the mobile unit, all base stations located within a given distance from the base station in which the mobile unit has registered its position become base stations to which a mobile paging signal (Page) is to be sent.

Since the mobile unit does not register its position unless it moves beyond a notified position registration distance, a mobile unit paging signal must be sent to all base stations within the corresponding range. That is, in the distance-based position registration scheme, a mobile unit paging area (simultaneous paging area) is present for each base station in which a mobile unit has registered its position. For this reason, when a mobile unit paging signal is to be sent to base stations by using the broadcast function, broadcast patterns equal in number to the base stations are required.

Similar techniques are disclosed in Japanese Patent Laid-Open Nos. 5-122136 and 6-78356.

In the conventional distance-based position registration scheme described above, different simultaneous paging areas each set for every base station as a center in which a mobile unit has registered its position must be defined as simultaneous broadcast areas. For this reason, identifiers (broadcast area identifiers) for identifying the respective simultaneous broadcast areas equal in number to the base stations must be prepared. These identifiers occupy the finite address space in the apparatus.

If, for example, a base station control apparatus uses the broadcast function of the ATM (Asynchronous Transfer Mode) to send a mobile unit paging signal to base stations, broadcast tables equal in number to the base stations are required.

SUMMARY OF THE INVENTION

The present invention has been made in consideration of the above problems in the prior art, and has as its object to provide a simultaneous paging signal sending system which can perform paging with respect to simultaneous broadcast areas with a small number of broadcast area identifiers, a sending method used for the system, and a recording medium on which a control program of the sending method is recorded.

In order to achieve the above object, according to the present invention, a plurality of simultaneous paging areas for simultaneous broadcasting to mobile units are grouped into one simultaneous broadcast area, and information about a base station in each simultaneous broadcast area is stored in correspondence with a broadcast area identifier allocated to each simultaneous broadcast area. Information about a base station corresponding to a broadcast area identifier included in a paging signal is read out from a memory, and the paging signal is copied and distributed to each base station designated by the readout information.

More specifically, an MIN (Mobile Identification Number: terminating signal)→LAI (Location Area Identification: position registration area identifier) converting section of a base station control apparatus searches for a position registration area identifier LAI on the basis of a terminating signal MIN and generates a paging signal a to which the position registration area identifier LAI is added.

An LAI→BAI (Broadcast Area Identification) converting section searches the paging signal a for a broadcast address identifier BAI(n*) corresponding to the position registration area identifier LAI added to the paging signal a, and generates a paging signal b to which the broadcast address identifier BAI(n*) is added.

An output port searching section searches for an output port of a base station ATM (Asynchronous Transfer Mode) switch which is made to correspond to a broadcast area identifier BAI(n) having the broadcast address identifier BAI(n*) as a group element on the basis of the broadcast address identifier BAI(n*) added to the paging signal b, and transmits the paging signal b to each base station by using the broadcast function of the ATM switch in accordance with the search result.

Each base station searches for the position registration area identifier LAI on the basis of the broadcast address identifier BAI(n*) added to the paging signal b received from the base station control apparatus, and sends the paging signal a into the air.

With this operation, according to the present invention, since a plurality of position registration area identifiers LAI are allocated to a single broadcast area identifier BAI(n), the number of broadcast area identifiers can be decreased, and the existing broadcast function of the ATM can be used.

BRIEF DESCRIPTION OF THE DRAWINGS

FIG. 2A is a view showing an example of the format of a paging signal a converted from a terminating signal by an MIN→LAI converting section in FIG. 1;

FIG. 2B is a view showing an example of the format of a paging signal b converted from the paging signal a by an LAI→BAI converting section in FIG. 1;

FIG. 3 is a view showing an example of the arrangement of a position register incorporated in a paging signal generating section in FIG. 1;

FIG. 5 is a view showing an example of the arrangement of a BAI→base station correspondence table incorporated in a signal copying/distributing section in FIG. 1;

FIG. 6 is a view showing an example of the arrangement of a BAI→LAI conversion table incorporated in each base station in FIG. 1;

FIGS. 7A, 7B, 7C, and 7D are views each showing an example of a position registration area in an embodiment of the present invention;

DESCRIPTION OF THE PREFERRED EMBODIMENT

Figure 1:
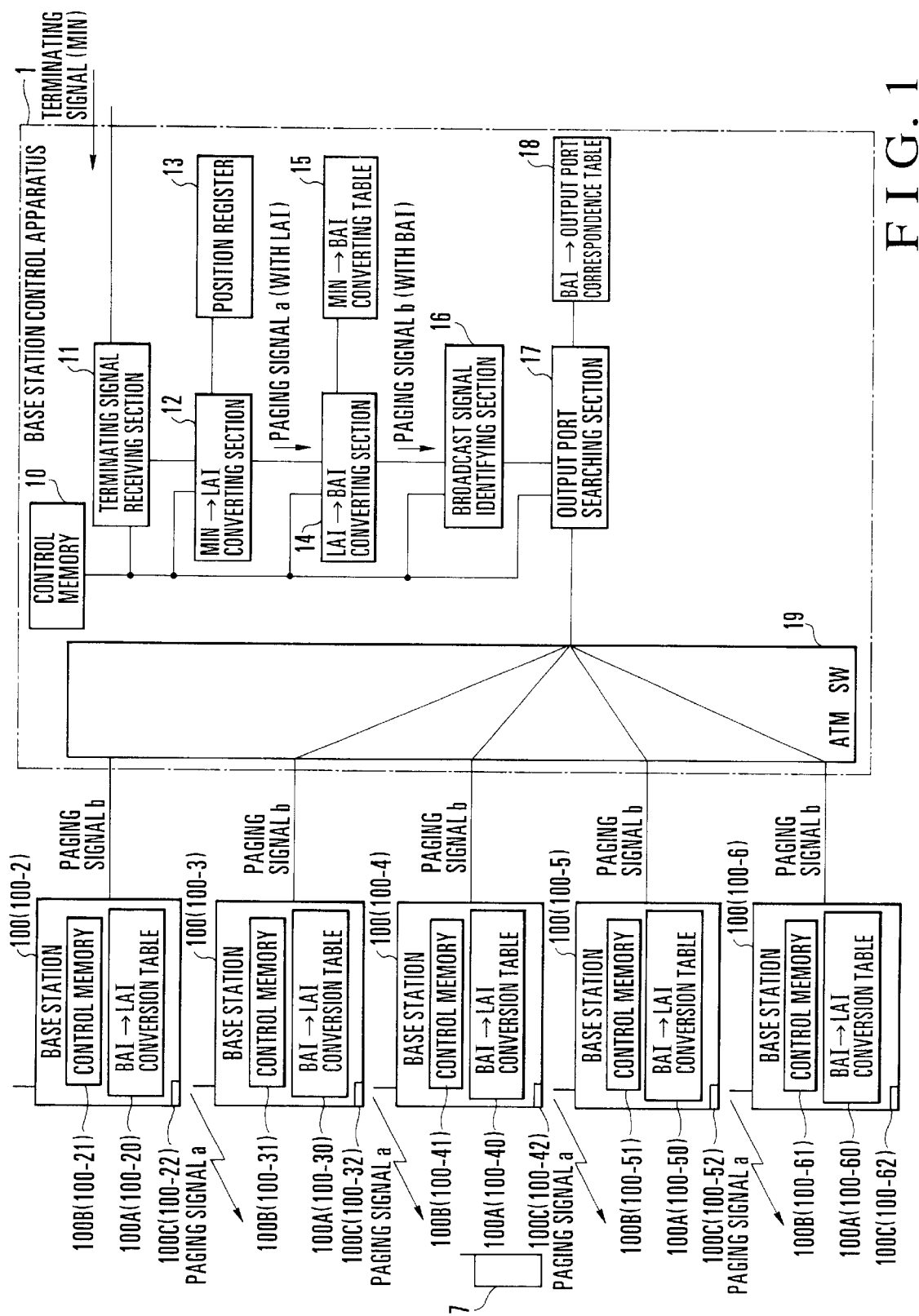
FIG. 1 is a block diagram showing the arrangement of a simultaneous paging signal sending system according to an embodiment of the present invention.

An embodiment of the present invention will be described next with reference to the accompanying drawings. FIG. 1 shows the arrangement of a simultaneous paging signal sending system according to an embodiment of the present invention. This simultaneous paging signal sending system is comprised of a base station control apparatus 1, base stations 100 (100-2 to 100-6), and a mobile unit 7.

The base station control apparatus 1 is comprised of a control memory 10, terminating signal receiving section 11, MIN (Mobile Identification Number: terminating signal) →LAI (Location Area Identification: position registration area identifier) converting section 12, position register 13, LAI→BAI (Broadcast Area Identification) converting section 14, LAI→BAI converting table 15, broadcast signal identifying section 16, output port searching section 17, BAI→output port correspondence table 18, and ATM (Asynchronous Transfer Mode) switch (ATM SW) 19.

The base stations 100 (100-2 to 100-6) respectively include BAI→LAI conversion tables 100A (100-20 to 100-60), control memories 100B (100-21 to 100-61), and transmitting sections 100C (100-22 to 100-62). These base stations are respectively connected to the corresponding output ports of the ATM switch 19 of the base station control apparatus 1.

The control memory 10 stores programs respectively executed by the terminating signal receiving section 11, MIN→LAI converting section 12, LAI→BAI converting section 14, broadcast signal identifying section 16, and output port searching section 17. The control memories 100-21 to 100-61 store programs respectively executed by the base stations 100-2 to 100-6. As the control memories 10 and 100-21 to 100-61, ROMs (Read-Only Memories) or IC (Integrated Circuit) memories can be used.

In this case, the position register 13 is connected to the MIN→LAI converting section 12, the LAI→BAI converting table 15 is connected to the LAI→BAI converting section 14, and the BAI→output port correspondence table (base station table) 18 is connected to the output port searching section 17.

FIG. 2A shows an example of the format of a paging signal a converted from a terminating signal by the MIN→LAI converting section 12 in FIG. 1. FIG. 2B shows an example of the format of a paging signal b converted from the paging signal a by the LAI→BAI converting section 14 in FIG. 1.

Referring to FIG. 2A, the paging signal a includes a broadcast data identifier and position registration area identifier (LAI). Referring to FIG. 2B, the paging signal b is an ATM cell and has a broadcast data identifier and broadcast address identifier (BAI(n*) where n=a, b, c, . . . ) in the header portion (Virtual Path Identifier) or VCI (Virtual Channel Identifier) of the ATM cell.

In this case, the paging signal a may be an ATM cell or not, and a broadcast data identifier and broadcast address identifier (BAI (n*)) may be respectively allocated to the VPI and VCI of the paging signal b.

FIG. 3 shows an example of the arrangement of the position register 13. Referring to FIG. 3, a position registration area identifier LAI indicating the position registration area of the mobile unit 7 is stored in the position register 13 in correspondence with a terminating signal MIN.

Figure 4:
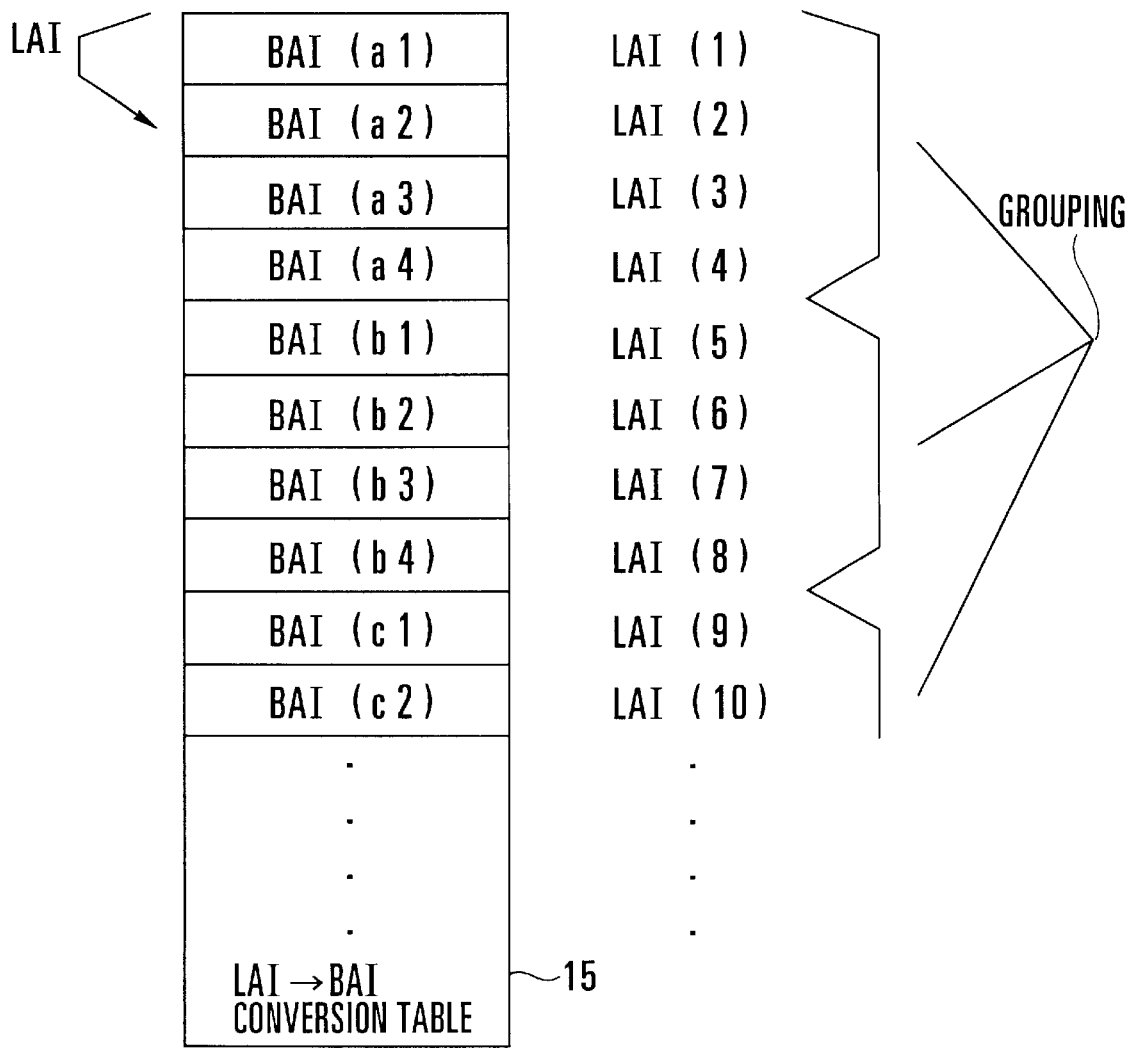
FIG. 4 is a view showing an example of the arrangement of an LAI→BAI conversion table incorporated in the LAI→BAI converting section in FIG. 1.

FIG. 4 shows an example of the arrangement of the LAI→BAI converting table 15. Referring to FIG. 4, broadcast address identifiers BAI(n*) are stored in the LAI→BAI converting table 15 in correspondence with the position registration area identifiers LAI.

In the table shown in FIG. 4, broadcast address identifiers BAI(a1), BAI(a2), BAI(a3), and BAI(a4) are respectively made to correspond to position registration area identifiers LAI(1), LAI(2), LAI(3), and LAI(4). In addition, the broadcast address identifiers BAI(a1), BAI(a2), BAI(a3), and BAI(a4) are formed into one group and serve as group elements of a broadcast address identifier BAI(a).

In addition, broadcast address identifiers BAI(b1), BAI (b2), BAI(b3), and BAI(b4) are respectively made to correspond to position registration area identifiers LAI(5), LAI(6), LAI(7), and LAI(8). In addition, the broadcast address identifiers BAI(b1), BAI(b2), BAI(b3), and BAI(b4) are formed into one group and serve as group elements of a broadcast address identifier BAI(b).

Furthermore, broadcast address identifiers BAI(c1) and BAI(c2) are respectively made to correspond to position registration area identifiers LAI(9), and LAI(10), the broadcast address identifiers BAI(c1) and BAI(c2) are formed into one group and serve as group elements of a broadcast address identifier BAI(c).

FIG. 5 shows an example of the arrangement of the BAI→output port correspondence table 18. Referring to FIG. 5, the output port numbers (#1, #2, #3, #4, #5, #6, #7, . . . ) of the ATM switch 19 are stored in the BAI→output port correspondence table 18 in correspondence with the broadcast area identifiers BAI(n).

In this case, in the BAI→output port correspondence table 18, the output port numbers of the ATM switch 19 which correspond to all the base stations 100 belonging to each broadcast area identifier BAI(n) are stored. For example, the output port numbers (#2, #3, #4, . . . ) are stored in the BAI→output port correspondence table 18 in correspondence with BAI(a).

FIG. 6 shows an example of the arrangement of the BAI→LAI conversion tables 100A in each base station 100.

Referring to FIG. 6, the position registration area identifiers LAI are stored in the BAI→LAI conversion tables 100A in correspondence with the broadcast address identifiers BAI (n*).

Referring to FIG. 6, the broadcast address identifiers BAI(a1), BAI(a2), BAI(a3), and BAI(a4) are respectively made to correspond to the position registration area identifiers LAI(1), LAI(2), LAI(3), and LAI(4).

In addition, the broadcast address identifiers BAI(b1), BAI(b2), BAI(b3), and BAI(b4) are respectively made to correspond to the position registration area identifiers LAI (5), LAI(6), LAI(7), and LAI(8).

Furthermore, the broadcast address identifiers BAI(c1) and BAI(c2) are respectively made to correspond to the position registration area identifiers LAI(9), and LAI(10).

The operation of the simultaneous paging signal sending system according to an embodiment of the present invention will be described below with reference to FIGS. 1 to 6. Upon reception of the external terminating signal MIN, the terminating signal receiving section 11 of the base station control apparatus 1 transfers it to the MIN→LAI converting section 12.

The MIN→LAI converting section 12 is connected to the position register 13. The MIN→LAI converting section 12 searches the position register 13 on the basis of the terminating signal MIN to generate the paging signal a to which the position registration area identifier LAI indicating the position registration area of the mobile unit 7 is added, and transfers the paging signal a to the LAI→BAI converting section 14.

The LAI→BAI converting section 14 is connected to the LAI→BAI converting table 15. On the basis of the position registration area identifier LAI of the paging signal a obtained by the MIN→LAI converting section 12, the LAI→BAI converting section 14 searches the LAI→BAI converting table 15 for the broadcast address identifier BAI(n*) corresponding to this LAI, generates the paging signal b by converting the position registration area identifier LAI added to the paging signal a into the broadcast address identifier BAI(n*), and transfers the paging signal b to the broadcast signal identifying section 16.

The broadcast signal identifying section 16 identifies the paging signal b (ATM cell) from the LAI→BAI converting section 14 as a broadcast signal or not, adds the identification result to the paging signal b, and transfers the resultant signal to the output port searching section 17.

The output port searching section 17 checks, on the basis of the identification result from the broadcast signal identifying section 16, whether the paging signal b input through the broadcast signal identifying section 16 is a signal using the broadcast function of the ATM switch 19. If this signal does not use the broadcast function, the output port searching section 17 sends the signal to the output port of the ATM switch 19 which corresponds to the destination of the signal so as to sent it thereto.

If the signal uses the broadcast function, the output port searching section 17 searches the BAI→output port correspondence table 18 for the output ports of the ATM switch 19 which correspond to the broadcast area identifier BAI(n) having the broadcast address identifiers BAI(n*) as its group elements, and sends the paging signal b, input through the broadcast signal identifying section 16, to the searched output ports of the ATM switch 19.

At this time, the paging signal b is simultaneously sent to a plurality of output ports of the ATM switch 19 by the broadcast function of the ATM. FIG. 1 shows a state wherein the paging signal b is simultaneously sent to the base stations 100-3 to 100-6.

In other words, the output port searching section 17 and ATM switch 19 make copies of the paging signal b by the number of base stations to which the paging signal b is to be sent on the basis of the broadcast area identifier BAI(n), and distribute the signals to the corresponding base stations 100.

By using the broadcast function of the ATM in the above manner, the lower layer function of the ATM can take charge of the above operations, i.e., copying the signal and distributing the signals to the base stations. This makes the user on the transmission side feel as if he were required only to send the signal to one base station.

Each of the base stations 100 is connected to the base station control apparatus 1 and includes the BAI→LAI conversion tables 100A. Each of the base stations 100 searches the BAI >LAI conversion tables 100A for the position registration area identifier LAI on the basis of the broadcast address identifier BAI(n*) added to the paging signal b received from the base station control apparatus 1, and sends the paging signal a, which is obtained by converting the broadcast address identifier BAI(n*) into the position registration area identifier LAI, into the air.

FIGS. 7A, 7B, 7C, and 7D are views showing examples of position registration areas in an embodiment of the present invention. Each of FIGS. 7A to 7D shows 100 base stations respectively arranged in 10×10 square areas, and more specifically, a base station in which a mobile unit has registered its position and base stations from which mobile unit paging signals are sent to the mobile unit whose position has been registered in the above base station.

The small-size numbers "0", "1", "2", "3", and "4" represent base stations. The large-size numbers "0", "1", "2", "3", and "4" represent the base stations in which the mobile units have registered their positions, and the small-size numbers "0", "1", "2", "3", and "4" represent the base stations from which the mobile unit paging signals are sent.

Figures 7A, 7B, 7C, 7D:
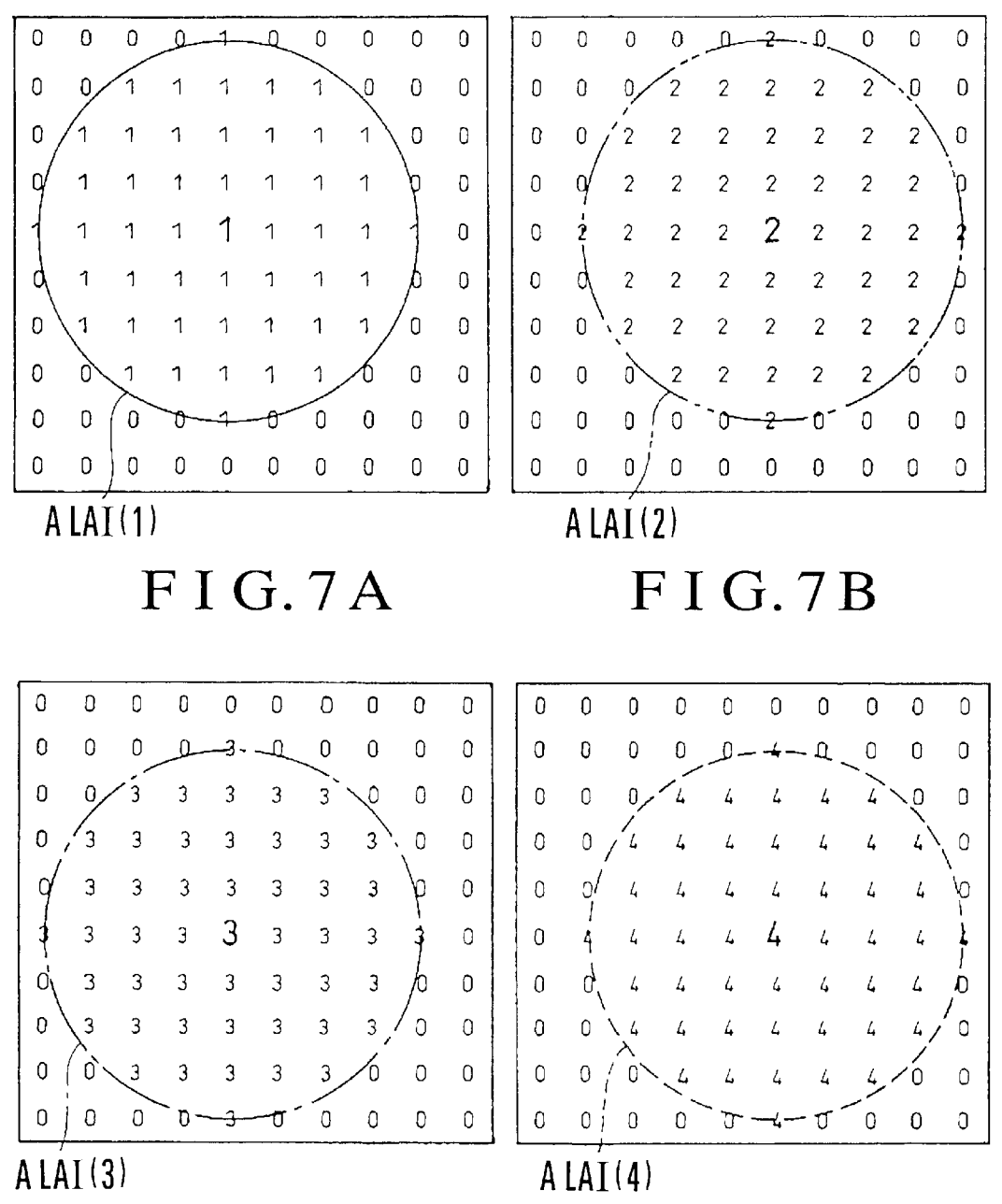

Referring to FIG. 7A, the small-size numbers "1" represent the base stations from which the mobile unit paging signals are sent to the mobile unit that has registered its position in the base station represented by the large-size number "1", and reference symbol ALAI(1) denotes a simultaneous paging area. Referring to FIG. 7B, the small-size numbers "2" represent the base stations from which the mobile unit paging signals are sent to the mobile unit that has registered its position in the base station represented by the large-size number "2", and reference symbol ALAI(2) denotes a simultaneous paging area.

Referring to FIG. 7C, the small-size numbers "3" represent the base stations from which the mobile unit paging signals are sent to the mobile unit that has registered its position in the base station represented by the large-size number "3", and reference symbol ALAI(3) denotes a simultaneous paging area. Referring to FIG. 7D, the small-size numbers "4" represent the base stations from which the mobile unit paging signals are sent to the mobile unit that has registered its position in the base station represented by the large-size number "4", and reference symbol ALAI(4) denotes a simultaneous paging area. Referring to FIGS. 7A to 7D, the numbers "0" represent the base stations from which no mobile unit paging signals are sent.

Figure 8:
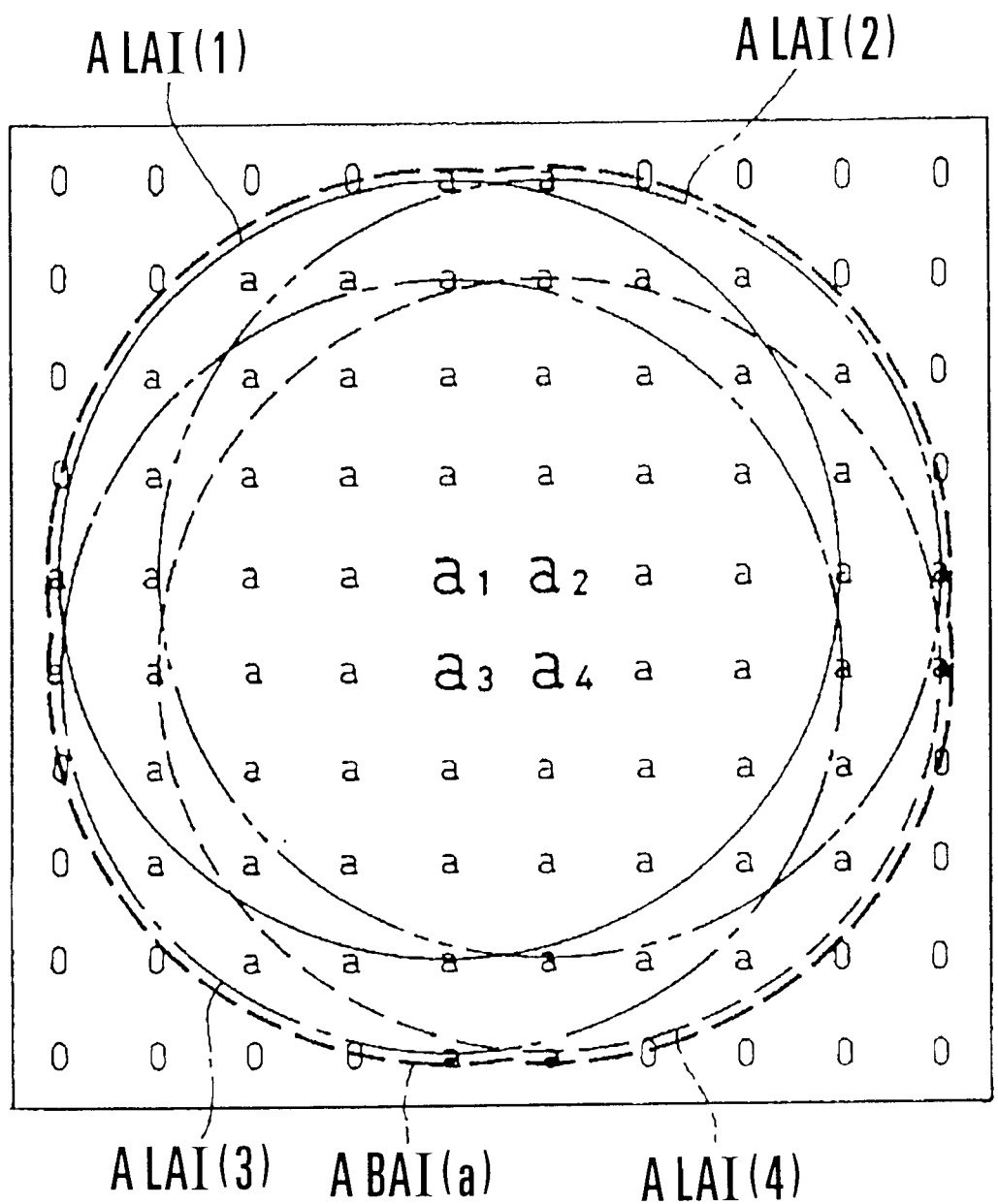
FIG. 8 is a view showing the relationship between position registration areas and broadcast paging areas in an embodiment of the present invention.

FIG. 8 shows the relationship between the position registration areas and simultaneous paging areas in an embodiment of the present invention. In this case, the adjacent base stations represented by the large-size numbers "1", "2", "3", and "4" in FIGS. 7A to 7D are formed into a group, and a combination of the simultaneous paging areas ALAI(1), ALAI(2), ALAI(3), and ALAI(4) is defined as a simultaneous paging area ABAI(a).

The base station represented by the large-size number "1" in FIG. 7A corresponds to the base station represented by the large-size symbol "a1" in FIG. 8. Likewise, the base stations represented by the large-size numbers "2" to "4" in FIGS. 7B to 7D respectively correspond to the base stations represented by the large-size symbols "a2" to "a4" in FIG. 8. In addition, the base stations from which mobile unit paging signals are sent are represented by the small-size letters "a". Note that the base stations represented by the large-size symbols "a1" to "a4" also send mobile unit paging signals.

The base station group that sends mobile unit paging signals in ABAI(a) is the sum of sets of the base station group that sends the signals in ALAI(1), base station group that sends the signals in ALAI(2), base station group that sends the signals in ALAI(3), base station group that sends the signals in ALAI(4).

Figure 9:
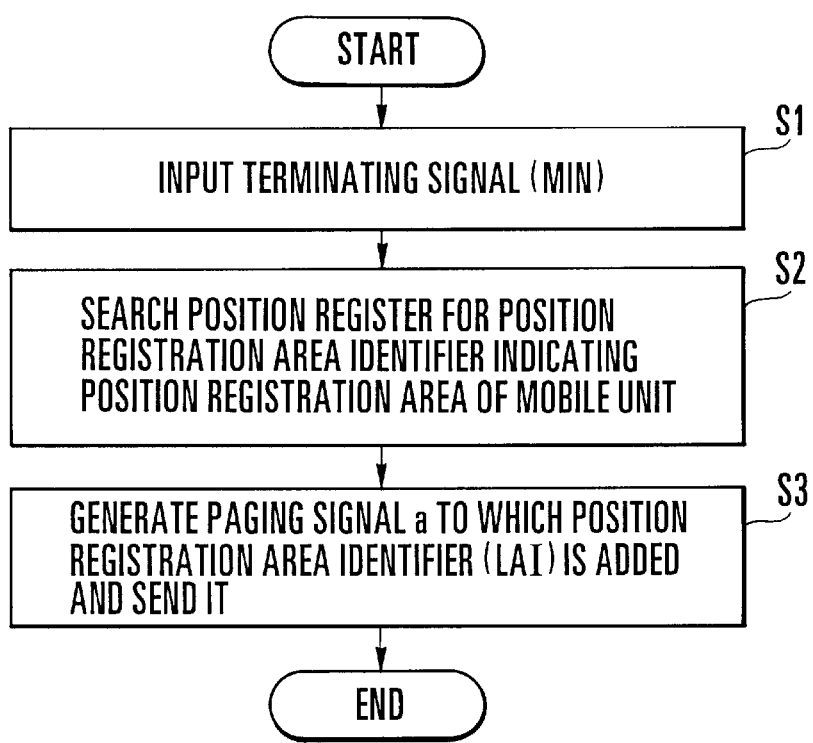
FIG. 9 is a flow chart showing the operation of the paging signal generating section in FIG. 1.
Figure 10:
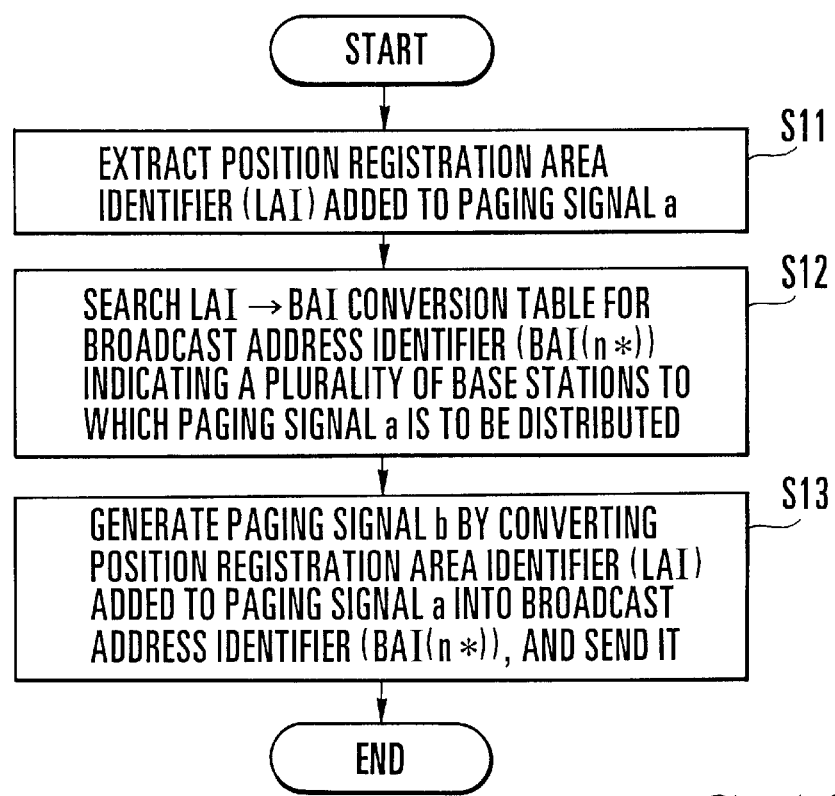
FIG. 10 is a flow chart showing the operation of the LAI→BAI converting section in FIG. 1.
Figure 11:
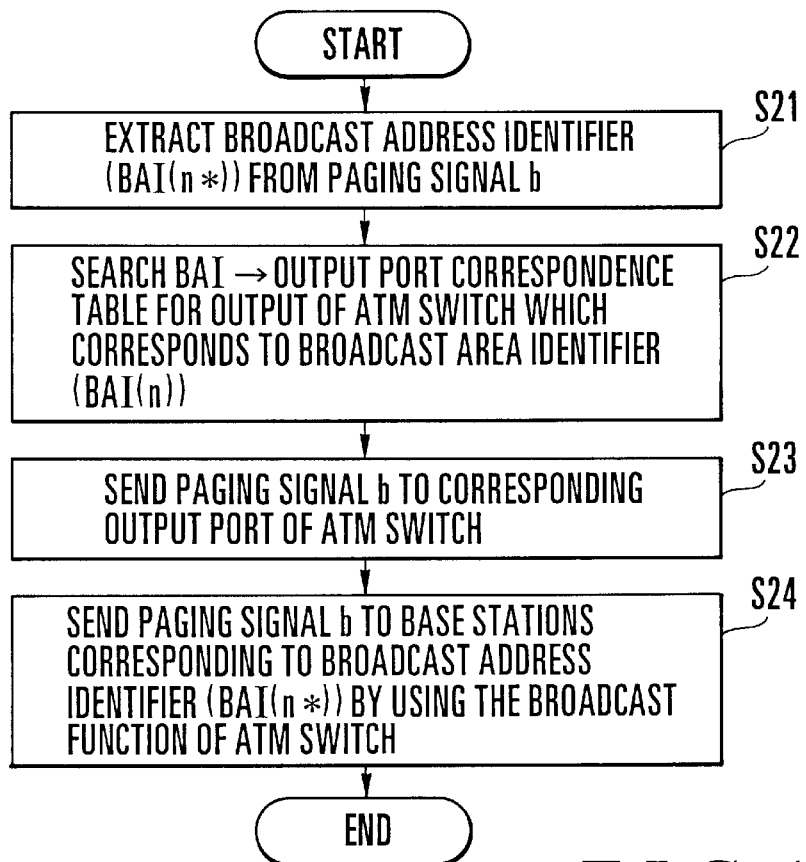
FIG. 11 is a flow chart showing the operation of the signal copying/distributing section in FIG. 1.
Figure 12:
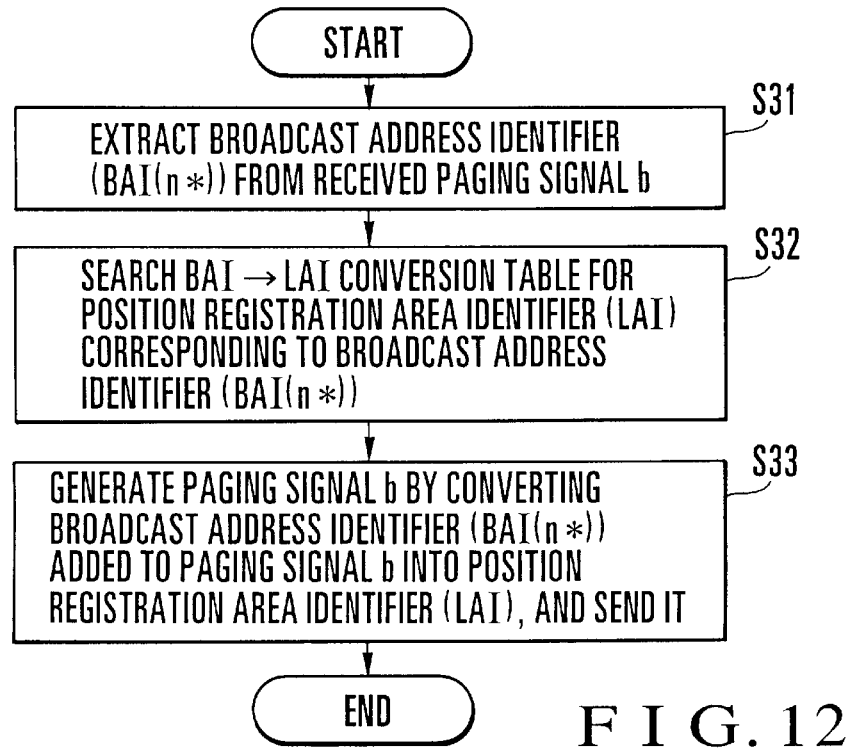
FIG. 12 is a flow chart showing the operation of each base station in FIG. 1.
Figure 13:
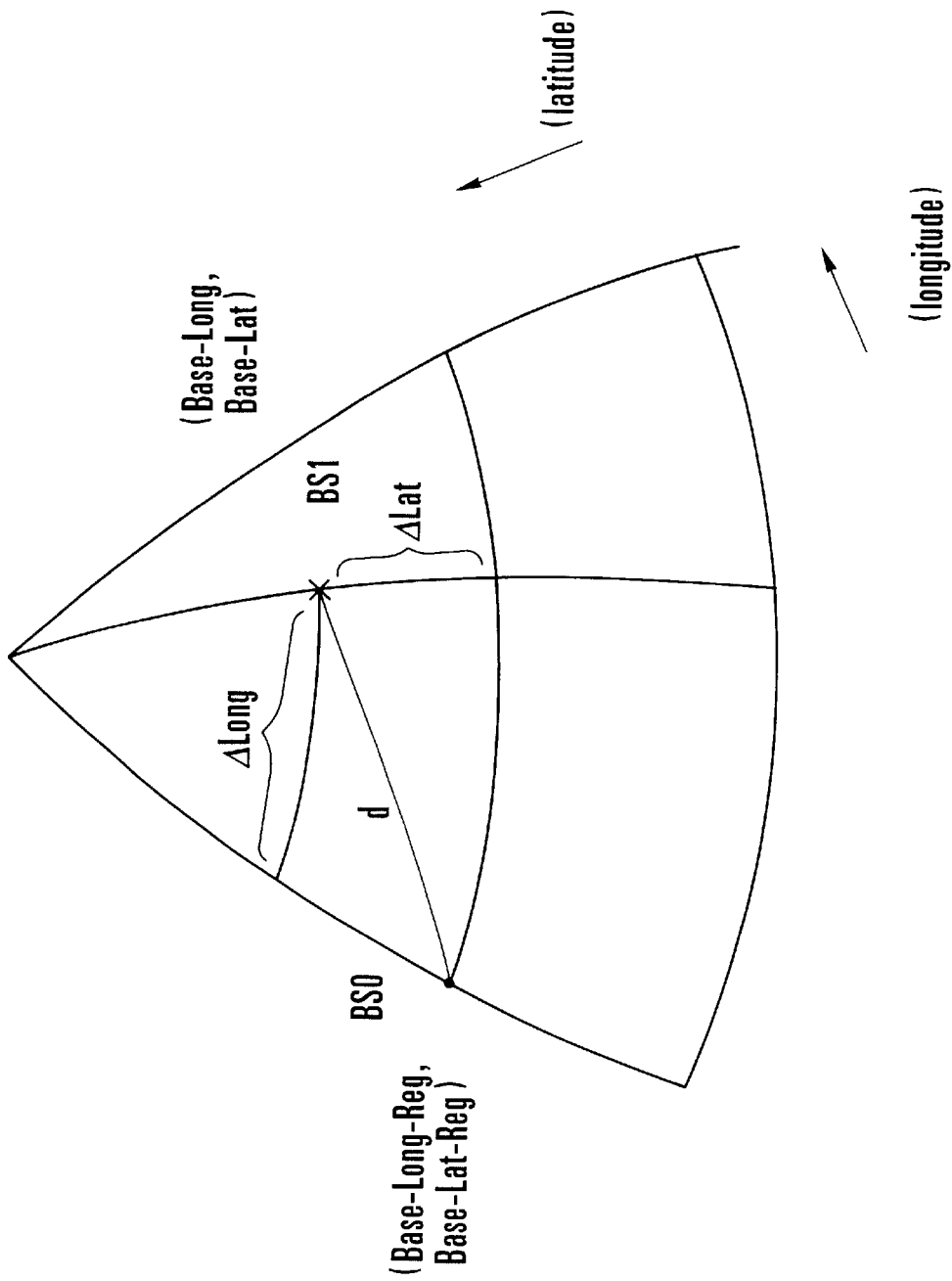
FIG. 13 is a view showing a method of calculating the distance between base stations in the prior art.
Figure 14:
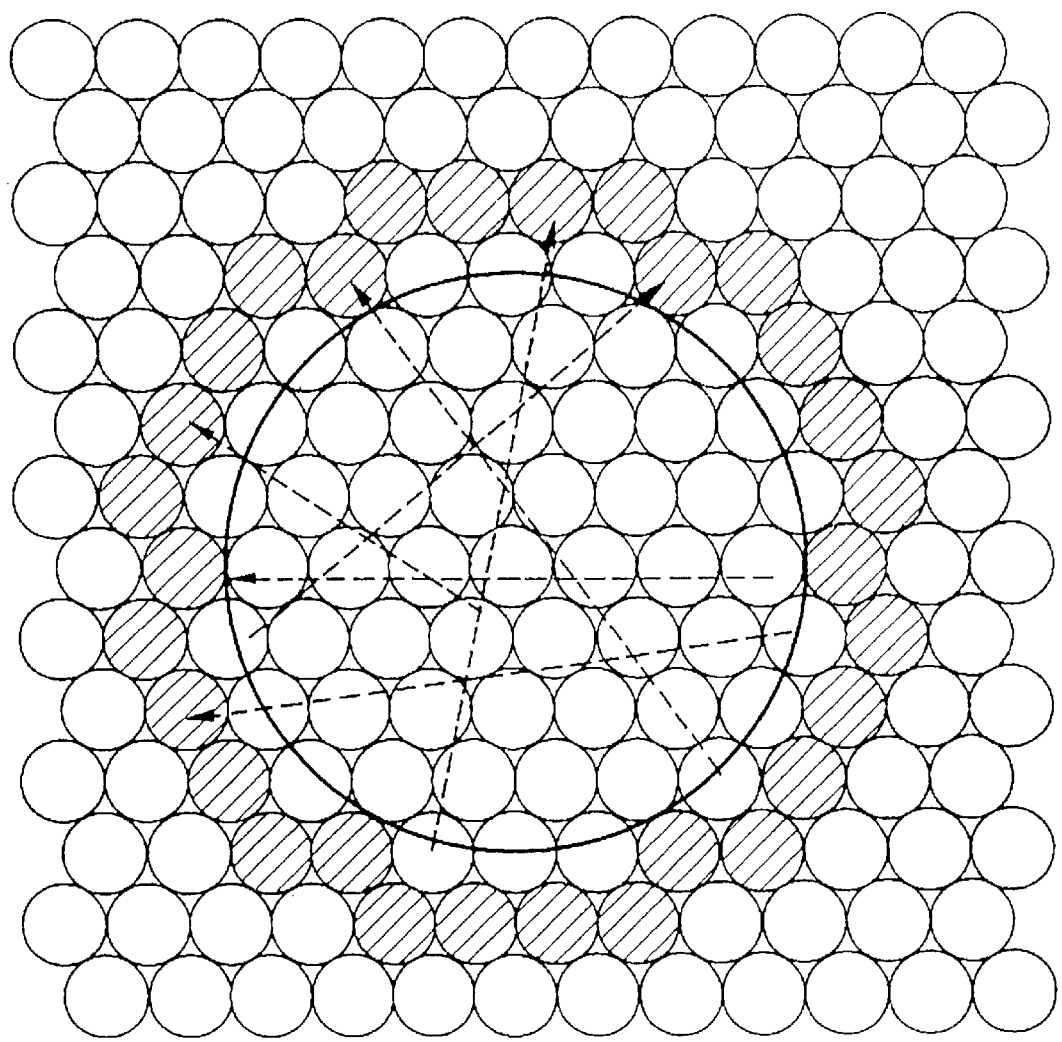
FIG. 14 is a view showing position registration stations in the conventional fixed position registration area scheme.
Figure 15:
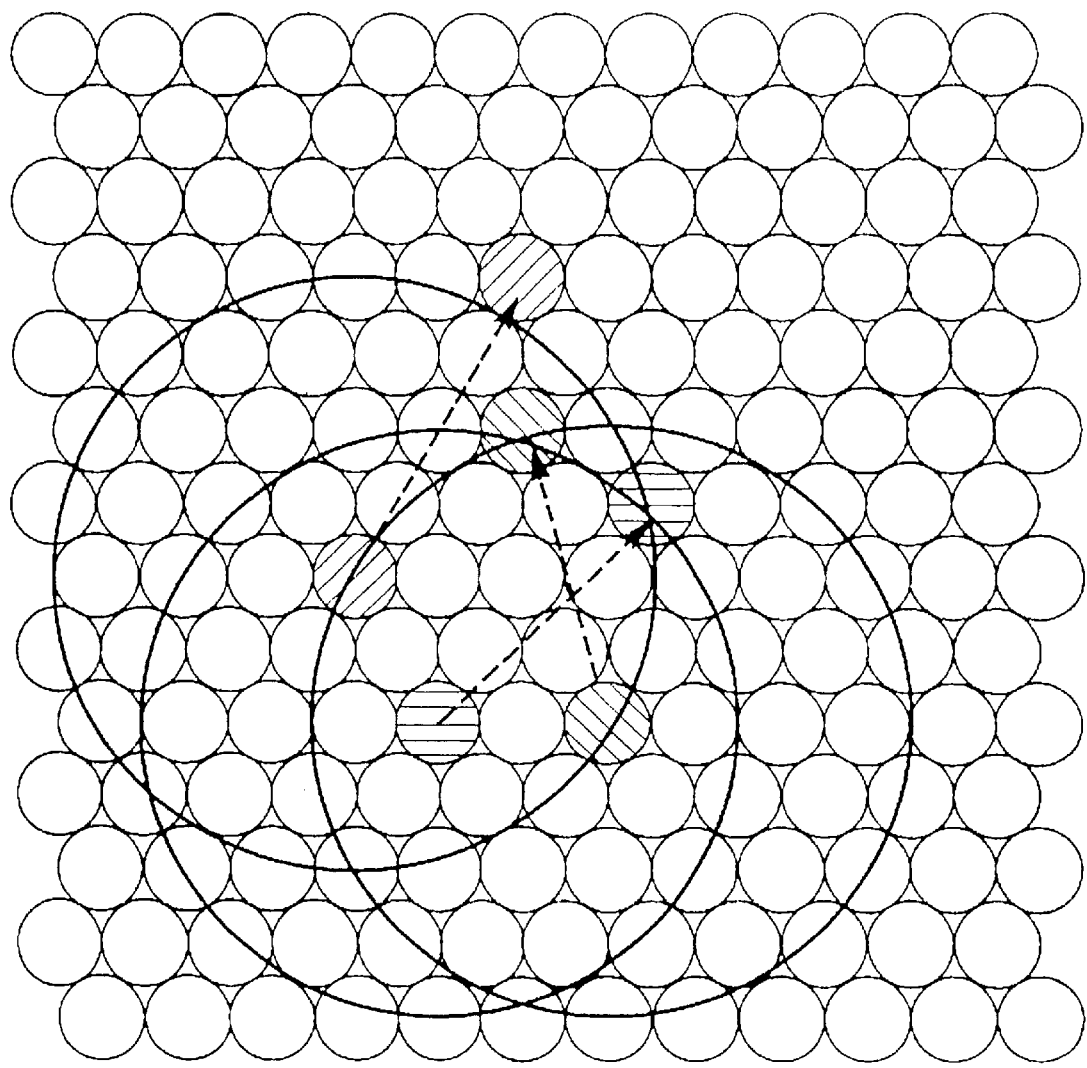
FIG. 15 is a view showing position registration stations in the conventional distance-based position registration area scheme.
Figure 16:
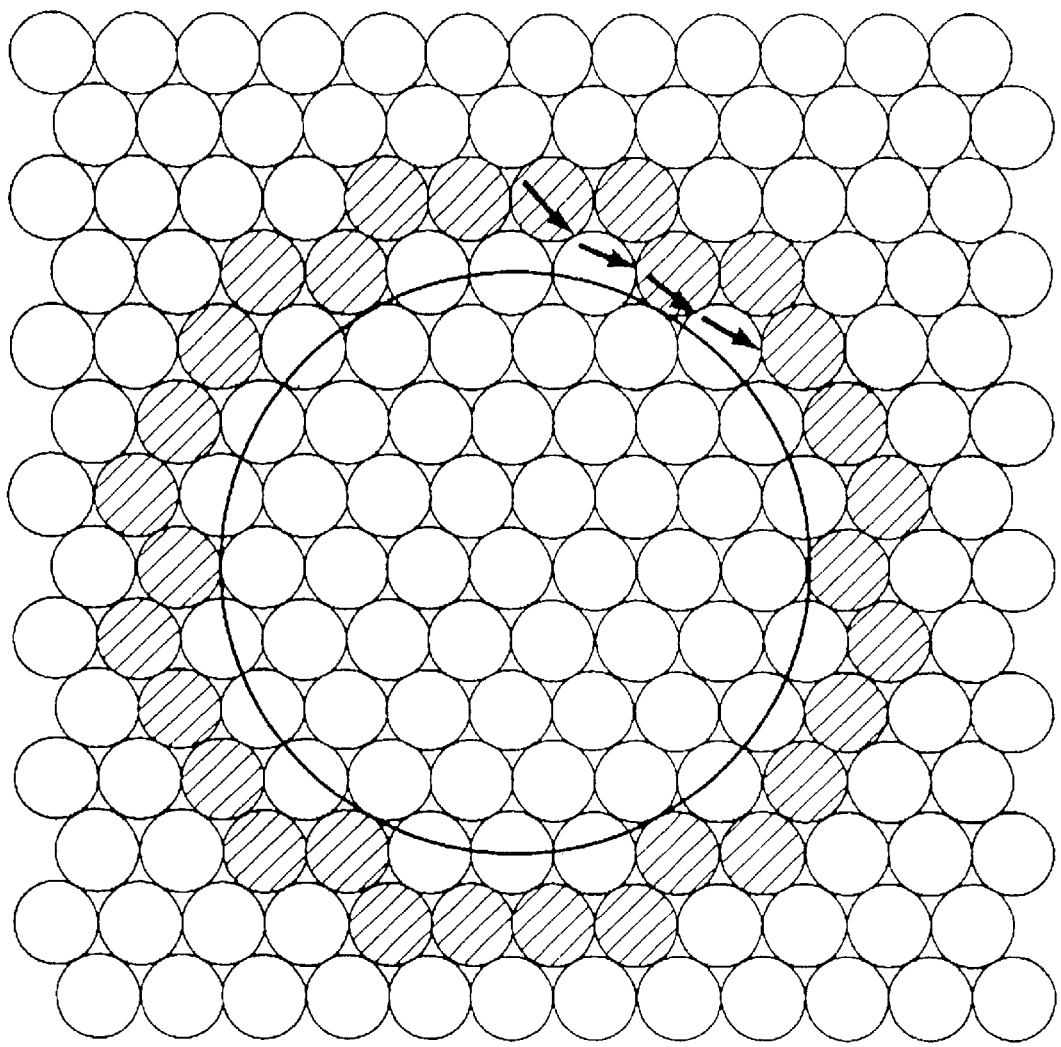
FIG. 16 is a view how position registration is performed in the conventional fixed position registration area scheme.
Figure 17:
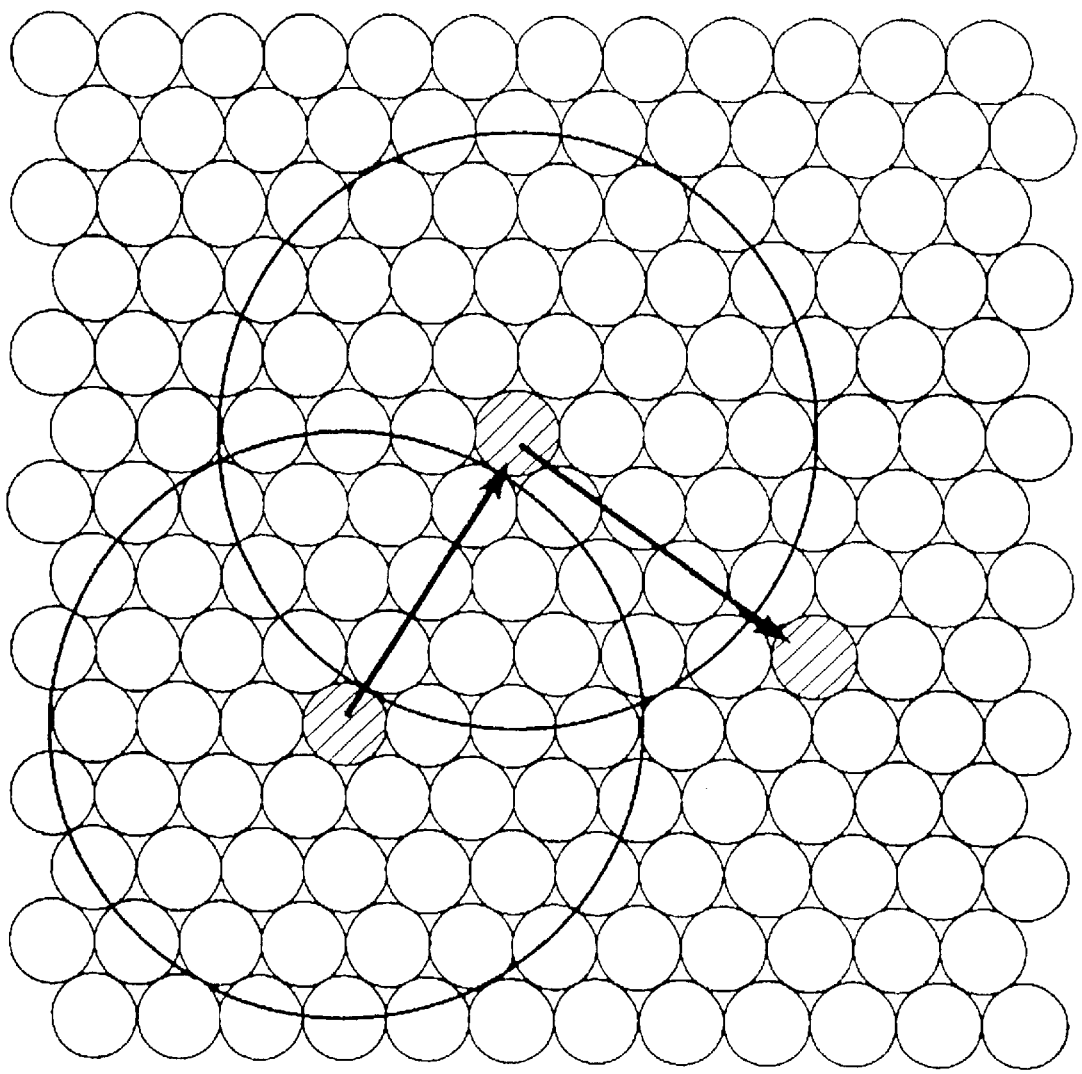
FIG. 17 is a view showing how position registration is performed in the conventional distance-based position registration area scheme.

FIG. 9 shows the operation of the MIN→LAI converting section 12. FIG. 10 shows the operation of the LAI→BAI converting section 14 in FIG. 1. FIG. 11 shows the operation of the output port searching section 17 in FIG. 1. FIG. 12 shows the operation of each base stations 100 in FIG. 1.

Operation to be performed when the terminating signal MIN to the mobile unit 7 is input to the base station control apparatus 1 will be described with reference to FIGS. 9 to 12. The operation shown in FIGS. 9 to 12 is realized when each component of the base station control apparatus 1 and each of the base stations 100 execute the programs stored in the control memory 10 and control memory 100B.

When the terminating signal MIN to the mobile unit 7 is input to the base station control apparatus 1 (step S1 in FIG. 9), the MIN→LAI converting section 12 of the base station control apparatus 1 searches the position register 13 for the identifier LAI indicating the position registration area of the mobile unit 7 on the basis of the terminating signal MIN (step S2 in FIG. 9), generates the paging signal a to which LAI is added, and sends the signal a to the LAI→BAI converting section 14 (step S3 in FIG. 9). The following description will be made assuming that the paging signal a to which LAI(2) is added is generated, and the resultant signal is sent to the LAI→BAI converting section 14.

The LAI→BAI converting section 14 searches for the broadcast address identifier BAI(a2) corresponding to LAI (2) on the basis of the position registration area identifier LAI(2) added to the paging signal a (steps S11 and S12 in FIG. 10), generates the paging signal b by converting LAI(2) added to the paging signal a into BAI(a2), and sends the paging signal b to the broadcast signal identifying section 16 (step S13 in FIG. 10).

In this embodiment, BAI(a1), BAI(a2), BAI(a3), and BAI(a4) are searched out on the basis of LAI(1), LAI(2), LAI(3), and LAI(4), and BAI(b1), BAI(b2), BAI(b3), and BAI(b4) are searched out on the basis of LAI(5), LAI(6), LAI(7), and LAI(8). In this case, BAI(a*) and BAI(b*) (where *=1, 2, 3, 4) respectively form the same groups and are regarded as identical address identifiers (broadcast area identifiers BAI(a) and BAI(b)) in the BAI→output port correspondence table 18.

The broadcast signal identifying section 16 identifies the paging signal b from the LAI→BAI converting section 14 as a broadcast signal or not. If the broadcast signal identifying section 16 identifies the paging signal b as a broadcast signal, the output port searching section 17 searches the BAI→output port correspondence table 18 for the output port of the ATM switch 19 which corresponds to the base station 100 that is made to correspond to the broadcast address identifier BAI(a) having the broadcast address identifier BAI(a2) as its group element on the basis of the broadcast address identifier BAI(a2) added to the paging signal b (steps S21 and S22 in FIG. 11).

The output port searching section 17 sends the paging signal b to the corresponding output port of the ATM switch 19 (step S23 in FIG. 11). The paging signal b is then transmitted to the corresponding base station 100 by the broadcast function of the ATM switch 19 (step S24 in FIG. 11). That is, the output port searching section 17 and ATM switch 19 make copies of the paging signal b by the number of corresponding base stations 100, and distribute the signals to the base stations 100 (100-3 to 100-6).

The base stations 100-3 to 100-6 search the BAI→LAI conversion tables 100-30 to 100-60 for LAI(2) on the basis of BAI(a2) of the paging signals b received through the ATM switch 19 of the base station control apparatus 1 (steps S31 and S32 in FIG. 12), and send the paging signals a, obtained by converting BAI(a2) added to the paging signals b into LAI(2), into the air (step S33 in FIG. 12).

Likewise, when a paging signal is to be sent to the mobile unit 7 whose position is registered in LAI(1), BAI(a1) is used as the broadcast address identifier BAI(n*). When paging signals are to be sent to the moving units 7 whose positions are registered in LAI(3) and LAI(4), BAI(a3) and BAI(a4) are used as the broadcast address identifiers BAI (n*). As described above, the output port searching section 17 regards BAI(a1), BAI(a2), BAI(a3), and BAI(a4) as identical address identifiers (broadcast area identifiers BAI (a)).

When, therefore, the position registration area identifier LAI searched out from a terminating signal (MIN) is LAI(1), LAI(2), LAI(3), or LAI(4), BAI(a) is used as a broadcast area identifier.

When LAI(1) to LAI(4) respectively have different broadcast area identifiers, four broadcast identifiers are required. If, however, LAI(1) to LAI(4) belong to the same group, the number of required broadcast area identifiers is ¼ that in the case wherein LAIs respectively have different broadcast area identifiers. That is, the number of required broadcast area identifies is one.

In this embodiment, four LAIs are formed into one group. If, however, 16 LAIs are formed into one group, the number of broadcast area identifiers is 1/16 that in the case wherein LAIs respectively have different broadcast area identifiers.

By grouping a plurality of simultaneous paging areas ALAI as the simultaneous broadcast area ABAI and allocating one identifier for paging the grouped simultaneous broadcast area ABAI as the broadcast area identifier BAI(n) in this manner, the number of broadcast area identifiers can be decreased to "1/number of base stations corresponding to each group" as compared with the conventional distance-based position registration scheme. With a small number of broadcast area identifiers, therefore, simultaneous broadcast areas can be paged.

In the conventional distance-based position registration scheme, every time a mobile unit exceeds a position registration distance, a new position must be registered. Even if the mobile unit is located outside the base station area where the position was previously registered and has moved to an adjacent base station area when the mobile unit exceeds the position registration distance, the new position must be registered.

Assume that the broadcast function of the ATM is used for this distance-based position registration scheme. In this case, when broadcast transmission is to be performed, all the base station areas, i.e., the base stations belonging to the base station areas centered on the respective base stations, must be registered in the required broadcast table. As the broadcast table, a large-capacity storage area is required. It is therefore practically impossible to use the broadcast function of the ATM for the conventional distance-based a position registration scheme.

In contrast to this, as described above, according to an embodiment of the present invention, since simultaneous broadcast areas can be paged with a small number of broadcast area identifiers, the broadcast function of the ATM (including the broadcast function of the existing ATM), which cannot be used in the prior art, can be used. In this case, the BAI→output port correspondence table 18 serves as a broadcast table.

As has been described above, according to the present invention, a combination of a plurality of simultaneous broadcast areas in which mobile units are simultaneously paged is defined as one simultaneous broadcast area, and information about the base stations in the simultaneous broadcast area is stored in correspondence with the broadcast area identifier allocated to each simultaneous broadcast area. Information about each base station corresponding to the broadcast area identifier included in a paging signal is read out from the memory, and copies of the paging signals are distributed to the base stations designated by the readout information. With a small number of broadcast area identifiers, therefore, simultaneous broadcast areas can be paged.

What is claimed is:

1. A simultaneous paging signal sending system comprising at least one mobile unit, a plurality of base stations for performing communication with said mobile unit, and a base station control apparatus for controlling said base stations, said base station control apparatus comprising:

base station information storage means for grouping a plurality of simultaneous paging areas, in which simultaneous broadcasting is performed to said mobile unit, into one simultaneous broadcast area and storing information about each base station in the simultaneous broadcast area to be paired with a broadcast area identifier allocated to each simul taneous broadcast area; and signal copying/distributing means for reading out information about said base stations corresponding to the broadcast area identifier included in a paging signal from said base station information storage means, and copying and distributing the paging signal to said base stations designated by the readout information, wherein a position location area identifier of said mobile unit that is included in a terminating signal, is utilized by said base station control apparatus to determine a broadcast area identifier of one said base stations corresponding to said position location area identifier, the broadcast area identifier being assigned to a group of base stations, and wherein the paging signal is copied and distributed by said signal copying/distributing means to each base station of said group of base stations.

2. A simultaneous paging signal sending system comprising at least one mobile unit, a plurality of base stations for performing communication with said mobile unit, and a base station control apparatus for controlling said base stations, said base station control apparatus comprising:
first paging signal generating means for searching a terminating signal for a position registration area identifier indicating said base station in which said mobile unit has registered a position thereof, and generating a first paging signal to which the position registration area identifier is added;
second paging signal generating means for searching for a broadcast address identifier corresponding to the position registration area identifier on the basis of the position registration area identifier added to the first paging signal, and generating a second paging signal to which the broadcast address identifier is added; and
signal copying/distributing means for reading out information about said base stations corresponding to a broadcast area identifier having the broadcast address identifier as a group element on the basis of the broadcast address identifier added to the second paging signal, copying and distributing the second paging signal to said base stations designated by the information, and
each of said base stations comprising
transmission means for searching for the position registration area identifier from the broadcast address identifier added to the second paging signal received from said base station control apparatus, and transmitting, to said mobile unit, the first paging signal to which position registration area identifier is added.

3. A system according to claim 2, wherein said signal copying/distributing means distributes the second paging signal to said base station by using a broadcast function of an asynchronous transfer mode.

4. A system according to claim 2, wherein said base station control apparatus comprises a position register for storing the position registration area identifier of said base station in which said mobile unit has registered a position thereof in correspondence with each mobile unit, and said first paging signal generating means generates the first paging signal by referring to said position register.

5. A system according to claim 2, wherein said base station control apparatus comprises a conversion table for storing the broadcast address identifier corresponding to the position registration area identifier in correspondence with each position registration area identifier, and said second paging signal generating means generates the second paging signal by looking up said conversion table.

6. A system according to claim 2, wherein said base station control apparatus comprises a base station table for storing information about said base station corresponding to the broadcast area identifier in correspondence with each broadcast area identifier, and said signal copying/distributing means copies/distributes second paging signal by looking up said base station table.

7. A system according to claim 2, wherein each of said base stations comprises storage means for storing a position registration area identifier corresponding to the broadcast address identifier in correspondence with each broadcast address identifier, and said transmission means transmits the first paging signal to said mobile unit by referring to said storage means.

8. A simultaneous paging signal sending method comprising:
providing at least one mobile unit, a plurality of base stations for performing communication with said mobile unit, and a base station control apparatus for controlling said base stations,
in said base station control apparatus, grouping a plurality of simultaneous paging areas, in which simultaneous broadcasting is performed to said mobile unit, into one simultaneous broadcast area, storing information about each base station in the simultaneous broadcast area to be paired with a broadcast area identifier allocated to each simultaneous broadcast area, reading out information about said base stations corresponding to the broadcast area identifier included in a paging signal from the stored information, and copying and distributing the paging signal to said base stations designated by the readout information,
wherein a position location area identifier of said mobile unit that is included in a terminating signal, is utilized by said base station control apparatus to determine a broadcast area identifier of one said base stations corresponding to said position location area identifier, the broadcast area identifier being assigned to a group of base stations, and
wherein the paging signal is copied and distributed by said base station control apparatus to each base station of said group of base stations.

9. A simultaneous paging signal sending method comprising:
providing at least one mobile unit, a plurality of base stations for performing communication with said mobile unit, and a base station control apparatus for controlling said base stations;
in said base station control apparatus, the first step of searching a terminating signal for a position registration area identifier indicating said base station in which said mobile unit has registered a position thereof, and generating a first paging signal to which the position registration area identifier is added;
in base station control apparatus, the second step of searching for a broadcast address identifier corresponding to the position registration area identifier on the basis of the position registration area identifier added to the first paging signal, and generating a second paging signal to which the broadcast address identifier is added;
in said base station control apparatus, the third step of reading out information about said base stations corresponding to a broadcast area identifier having the broadcast address identifier as a group element on the basis of the broadcast address identifier added to the second paging signal, copying and distributing the second paging signal to said base stations designated by the information; and
in each of said base stations, the fourth step of searching for the position registration area identifier from the broadcast address identifier added to the second paging signal received from said base station control apparatus, and transmitting, to said mobile unit, the first paging signal to which position registration area identifier is added.

10. A method according to claim 9, wherein the third step comprises distributing the second paging signal to said base stations by using a broadcast function of an asynchronous transfer mode.

11. A method according to claim 9, wherein the method further comprises providing, in said base station control apparatus, a position register for storing the position registration area identifier of said base station in which said mobile unit has registered a position thereof in correspondence with each mobile unit, and the first step comprises generating the first paging signal by looking up said position register.

12. A method according to claim 9, wherein the method further comprises providing, in said base station control apparatus, a conversion table for storing the broadcast address identifier corresponding to the position registration area identifier in correspondence with each position registration area identifier, and the second step comprises generating the second paging signal by looking up said conversion table.

13. A method according to claim 9, wherein the method further comprises providing, in said base station control apparatus, a base station table for storing information about said base station corresponding to the broadcast area identifier in correspondence with each broadcast area identifier, and the third step comprises copying/distributing the second paging signal by looking up said base station table.

14. A method according to claim 9, wherein the method further comprises providing, in each of said base stations, storage means for storing a position registration area identifier corresponding to the broadcast address identifier in correspondence with each broadcast address identifier, and the fourth step comprises transmitting the first paging signal to said mobile unit by referring to said storage means.

15. A recording medium on which a simultaneous paging signal sending control program for sending a simultaneous paging signal from a base station to a mobile unit is recorded in a system including at least one mobile unit, a plurality of base stations for performing communication with said mobile unit, and a base station control apparatus for controlling said base stations, wherein the simultaneous paging signal sending control program causes said base station control apparatus to search a terminating signal for a position registration area identifier indicating said base station in which said mobile unit has registered a position thereof, generate a first paging signal to which the position registration area identifier is added, search for a broadcast address identifier corresponding to the position registration area identifier on the basis of the position registration area identifier added to the first paging signal, generate a second paging signal to which the broadcast address identifier is added, read out information about said base stations corresponding to a broadcast area identifier having the broadcast address identifier as a group element on the basis of the broadcast address identifier added to the second paging signal, and copy and distribute the second paging signal to said base stations designated by the information; and causes each of said base stations to search for the position registration area identifier from the broadcast address identifier added to the second paging signal received from said base station control apparatus and transmit, to said mobile unit, the first paging signal to which position registration area identifier is added.

16. A medium according to claim 15, wherein when said base station control apparatus is caused to copy and distribute the second paging signal to said base station, the simultaneous paging signal sending control program causes said base station control apparatus to distribute the second paging signal to said base station by using a broadcast function of an asynchronous transfer mode.

17. A medium according to claim 15, wherein a position register for storing the position registration area identifier of said base station in which said mobile unit has registered a position thereof in correspondence with each mobile unit is provided in said base station control apparatus, and the simultaneous paging signal sending control program causes said base station control apparatus to generate the first paging signal by referring to said position register.

18. A medium according to claim 15, wherein a conversion table for storing the broadcast address identifier corresponding to the position registration area identifier in correspondence with each position registration area identifier is provided in said base station control apparatus, and the simultaneous paging signal sending control program causes said base station control apparatus to generate the second paging signal by looking up said conversion table.

19. A medium according to claim 15, wherein a base station table for storing information about said base station corresponding to the broadcast area identifier in correspondence with each broadcast area identifier is provided in said base station control apparatus, and the simultaneous paging signal sending control program causes said base station control apparatus to copy the second paging signal by looking up said base station table when causing said base station control apparatus to copy and distribute the second paging signal to said base station.

20. A system according to claim 2, wherein storage means for storing a position registration area identifier corresponding to the broadcast address identifier in correspondence with each broadcast address identifier is provided in each of said base stations, and the simultaneous paging signal sending control program causes said base station to transmit the first paging signal to said mobile unit by referring to said storage means.

* * * * *